Nov. 18, 1924.
G. H. DEIN
1,515,935
SHOCK ABSORBER FOR VEHICLES
Original Filed May 18, 1921
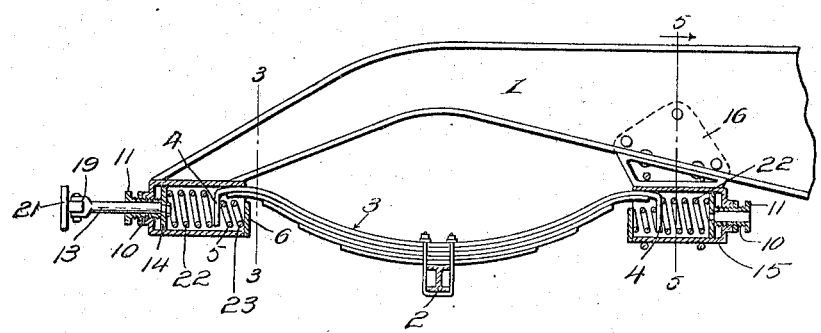
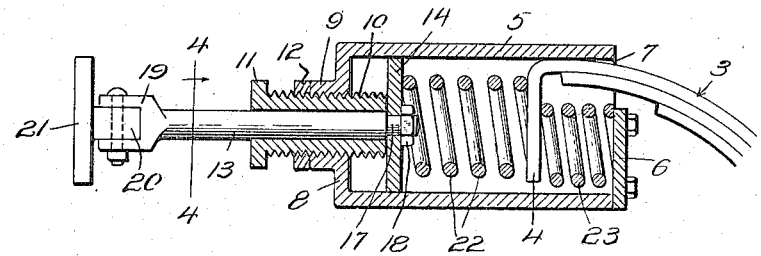
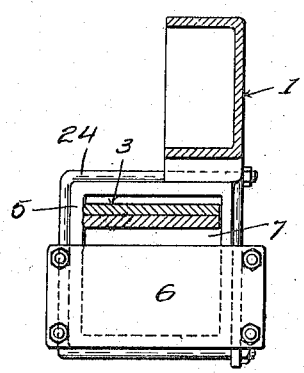
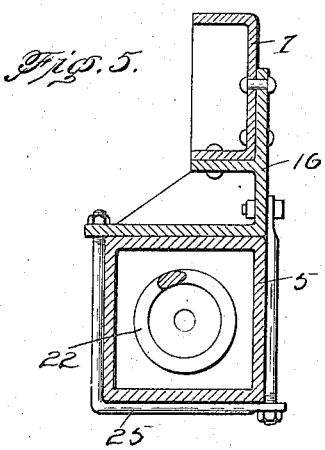
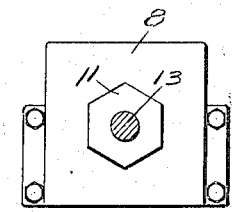
INVENTOR.
G H Dein
BY
Geo F Kimmel
ATTORNEY.

Patented Nov. 18, 1924.

1,515,935

UNITED STATES PATENT OFFICE.

GEORGE H. DEIN, OF BABYLON, NEW YORK.

SHOCK ABSORBER FOR VEHICLES.

Application filed May 18, 1921, Serial No. 470,634. Renewed April 15, 1924.

*To all whom it may concern:*

Be it known that I, GEORGE H. DEIN, a citizen of the United States, residing at Babylon, in the county of Suffolk and State of New York, have invented certain new and useful Improvements in Shock Absorbers for Vehicles, of which the following is a specification.

This invention relates to suspension springs for automobiles and more particularly to shock absorbers therefor.

The object of the invention is to provide a semi-elliptical suspension or supporting spring with shock absorbers constructed to resist both the upward and downward movement of the vehicle such as occurs when passing over rough or uneven roads or over other obstructions, said spring being held by the absorbers substantially in neutral position on the downward movement of the vehicle and restrained and cushioned on its upward movement thus avoiding the objectionable oscillation incident to the passage over such surfaces.

Another object is to provide a device for this purpose which cooperates with the ends of the semi-elliptical supporting spring and which is simple, durable and reliable and which may be readily adjusted to vary the cushioning or absorbing effect of the device.

Another object is to provide a device of this character which will also operate as cushioning means for the front or rear bumper or both, one of the devices being located at each corner of the vehicle frame.

With these and other objects in view, the invention consists in certain novel features of construction as hereinafter shown and described and then specifically pointed out in the claims.

In the accompanying drawings:

Figure 1 represents a side elevation of a portion of the vehicle frame equipped with this improved suspension spring and shock absorber with parts shown in section.

Figure 2 is an enlarged longitudinal sectional view of one of the shock absorbers connected with one end of the suspension or supporting spring.

Figure 3 is a transverse vertical section taken on the line 3—3 of Fig. 1.

Figure 4 is a similar view taken on the line 4—4 of Fig. 2, and,

Figure 5 is a similar view taken on the line 5—5 of Fig. 1.

In the embodiment illustrated one of the main longitudinal frame bars of an automobile or other vehicle is shown at 1 in connection with one of the transverse axles 2 and a supporting spring 3 preferably of semi-elliptical and leaf form which is connected at its central part to the axle 2 and the ends of which are connected with the absorbers constituting this invention.

The opposite ends of the uppermost leaf of each spring 3 are bent laterally downward as shown at 4 to provide means for connection with the shock absorbers presently to be described, the ends of said spring extending into the cylinders forming a part of the absorbers.

Four supporting springs 3 are preferably employed, two at each side of the car and each is equipped with two cylinders 5 and 15 arranged longitudinally relatively to the spring 3 and are exactly alike except that the cylinder 15 at the inner end of spring 3 is mounted on the frame 1 by means of a supporting plate or bracket 16 riveted or otherwise secured thereto while the other cylinder 5 at the outer end of said spring is mounted directly on the end of the frame 1 (see Fig. 1).

The two cylinders 5 and 15 being exactly alike in construction one only will be described in detail.

The cylinder 5 is provided with a removable closure 6 at its inner end, which closure has an opening 7 at the upper portion thereof for the passage therethrough of the end 4 of the spring 3 which is to be positioned within the cylinder for a purpose presently to be described.

The closure 8 at the front end of the cylinder 5 has a central aperture surrounded by an internally threaded collar 9 designed to adjustably receive an externally threaded sleeve 10 which is equipped at its outer end with a flanged head 11 to facilitate the manipulation thereof. A lock nut 12 is also mounted on the sleeve 10 in advance of the neck 9 to hold the sleeve in adjusted position.

A plunger rod 13 is mounted to reciprocate in the sleeve 10 and carries at its inner end within the cylinder 5 a piston 14 which is secured to the rod by any suitable means being here shown mounted on a reduced extension 17 the outer end of which is threaded to receive a retaining nut 18.

The plunger rod 13 may be of any desired length suitable for the purpose and is provided at its front end with an enlarged head 19 here shown bifurcated to receive an apertured lug 20 carried by one end of a bumper 21. This lug 20 is mounted between the bifurcations of the head 19, the other end of said bumper being similarly supported by the shock absorber at the opposite side of the front portion of the automobile.

Mounted in the cylinder 5 at the rear of the piston 14 are two coiled springs 22 and 23 between the inner ends of which the laterally extended end 4 of the spring 3 is positioned as is shown clearly in Figs. 1 and 2. The spring 22 is made larger than the spring 23 and is designed to cushion the supporting spring 3 on its downward movement and to hold said spring substantially in neutral position while the spring 23 operates to retard and cushion the upward movement of the suspension spring 3 thereby absorbing all shocks incident to the passage of the vehicle over rough surfaces.

As shown in Figs. 3 and 5 these cylinders or housings 5 and 15 are rectangular in transverse section which is designed for the purpose of preventing the ends of the suspension spring 3 from turning in said housings as shown in Fig. 3.

The housings 5 and 15 are shown provided respectively with hangers 24 and 25, the hanger 24 connecting the housing 5 with the front end of the frame 1, while the hanger 25 connects the rear or inner housing 15 with the bracket 16.

From the above description it will be obvious that the mounting of the laterally bent ends 4 of the suspension spring 3 in the housings 5 and 15 between the coiled springs 22 and 23 will provide for the cushioning of the spring 3 the larger springs 22 in the housings operating to cushion spring 3 on its expansion while the smaller springs 23 cushion it on the contraction or upward movement thus absorbing all shocks and greatly increasing the comfort of the riders in the car.

It is of course understood that one of these devices is mounted at each corner of the frame of the car or automobile and the springs in the outermost housing 5 in addition to cushioning the end of spring 3 operate also as cushions for the piston 14 carried by the bumper 21. The sleeve 10 in addition to forming a guide for the plunger rod 13 is also designed as an adjusting means for varying the tension of the springs 22 and 23.

The inner housing 15 of course dispenses with the plunger rod 13 since it is not necessary here to apply any bumper and the piston 14ª instead of being carried by said rod is mounted loosely in the housing between the inner end of the sleeve 10 and the outer end of the spring 22 so that when the sleeve 10 is adjusted the tension of the springs will be varied, the piston 14ª operating as a bearing for the outer end of the spring 22.

It is to be understood of course that one of these suspension springs 3 is mounted in each corner of the vehicle chassis with the ends connected with the shock absorbers as above described and preferably two bumpers are employed one at the front and one at the rear of the automobile, the rear bumper (not shown) being mounted in the same manner that the bumper 21 is mounted and as hereinabove described.

The preferred embodiment of the invention is disclosed in the drawings and set forth in the specification, but it will be understood that any modifications within the scope of the claimed invention may be made in the construction without departing from the principle of the invention or sacrificing any of its advantages.

What is claimed is:

1. A shock absorber for vehicles comprising a piston chamber to be arranged horizontally on the vehicle and having openings in opposite ends thereof, a plurality of coiled springs arranged end to end within said housing, an elliptical vehicle spring having one end extended through one end wall of said housing and provided with a lateral extension at its terminal inserted between the inner ends of said coiled springs, and means for varying the adjustment of said coiled springs.

2. A shock absorber for vehicles comprising a piston chamber to be arranged horizontally on the vehicle and having openings in opposite ends thereof, a plurality of coiled springs arranged end to end within said housing, an elliptical vehicle spring having one end extended through one end wall of said housing and provided with a lateral extension at its terminal inserted between the inner ends of said coiled springs, means for varying the adjustment of said coiled springs, said means comprising a piston arranged between the outer end of said housing and the outer end of the outer spring, and means for adjusting said piston in said housing to vary the tension of the springs.

3. A shock absorber for vehicles comprising an elliptical vehicle spring, housings arranged at opposite ends of said spring horizontally on the vehicle, openings in the inner ends of said housings to receive the ends of said spring, said ends being provided with lateral extensions, coiled springs mounted end to end in said housing and between which said lateral extension is positioned, pistons mounted to reciprocate in the outer ends of said housing, and threaded members mounted in said housing ends to vary the position of the pistons and correspondingly adjust the tension of the coiled springs within the housing.

In testimony whereof, I affix my signature hereto.

GEORGE H. DEIN.